United States Patent
Yezerets et al.

(10) Patent No.: US 9,080,524 B2
(45) Date of Patent: Jul. 14, 2015

(54) SYSTEM, METHOD, AND APPARATUS FOR SULFUR RECOVERY ON AN SCR CATALYST

(71) Applicant: Cummins Inc., Columbus, IN (US)

(72) Inventors: Aleksey Yezerets, Columbus, IN (US); Krishna Kamasamudram, Columbus, IN (US); Neal W. Currier, Columbus, IN (US); Ashok Kumar, Columbus, IN (US); Michael A. Smith, Clarkston, MI (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 14/189,462

(22) Filed: Feb. 25, 2014

(65) Prior Publication Data

US 2014/0237996 A1    Aug. 28, 2014

Related U.S. Application Data

(60) Provisional application No. 61/768,773, filed on Feb. 25, 2013.

(51) Int. Cl.
  *F01N 3/20* (2006.01)
  *F02D 41/02* (2006.01)
  (Continued)

(52) U.S. Cl.
  CPC ............ *F02D 41/0235* (2013.01); *B01J 38/04* (2013.01); *B01J 38/06* (2013.01); *B01J 38/08* (2013.01); *B01J 38/56* (2013.01); *F01N 3/0885* (2013.01); *F01N 3/106* (2013.01); *F01N 3/208* (2013.01); *F01N 3/2066* (2013.01); *F01N 3/2033* (2013.01); *F01N 11/00* (2013.01); *F01N 2550/02* (2013.01); *F01N 2610/02* (2013.01);
  (Continued)

(58) Field of Classification Search
  CPC ....... F01N 3/106; F01N 3/2033; F01N 3/208; F01N 11/00; F01N 2550/02; F01N 2570/04; F01N 2610/02; F01N 2610/03; F01N 2610/146; F01N 2900/1404; F01N 2900/1612; F01N 3/0885
  USPC ........... 60/274, 277, 285, 286, 295, 300, 301, 60/303, 320
  See application file for complete search history.

(56) References Cited

U.S. PATENT DOCUMENTS

| | | |
|---|---|---|
| 4,795,725 A | 1/1989 | Addink et al. |
| 5,270,272 A | 12/1993 | Galperin et al. |

(Continued)

FOREIGN PATENT DOCUMENTS

| | | |
|---|---|---|
| EP | 2420655 A1 | 2/2012 |
| EP | 2557285 A1 | 2/2013 |
| WO | 2009135071 A2 | 11/2009 |

OTHER PUBLICATIONS

European Patent Office, Extended European Search Report and Written Opinion, Jun. 2, 2014, 7 pages.

*Primary Examiner* — Thomas Denion
*Assistant Examiner* — Jorge Leon, Jr.
(74) *Attorney, Agent, or Firm* — Taft Stettinius & Hollister LLP

(57) ABSTRACT

System, apparatus, and methods are disclosed for treating a reduction catalyst that has been exposed to an amount of sulfur. The treating of the reduction catalyst includes providing a fluid stream at a position upstream of the reduction catalyst. The fluid stream includes a temperature and a reductant amount, and the reductant amount includes an amount of urea, ammonia, or hydrocarbons.

27 Claims, 6 Drawing Sheets

(51) Int. Cl.
*F01N 3/08* (2006.01)
*F01N 3/10* (2006.01)
*B01J 38/06* (2006.01)
*B01J 38/08* (2006.01)
*B01J 38/56* (2006.01)
*B01J 38/04* (2006.01)
*F01N 11/00* (2006.01)

(52) U.S. Cl.
CPC ....... *F01N2610/03* (2013.01); *F01N 2610/146* (2013.01); *F01N 2900/1404* (2013.01); *Y02T 10/24* (2013.01)

(56) References Cited

U.S. PATENT DOCUMENTS

| | | | |
|---|---|---|---|
| 5,585,081 A | 12/1996 | Chu et al. | |
| 6,300,268 B1 | 10/2001 | Lapidus et al. | |
| 6,805,849 B1* | 10/2004 | Andreasson et al. | 423/239.1 |
| 8,141,340 B2 | 3/2012 | Garimella et al. | |
| 2004/0112042 A1 | 6/2004 | Hoffmann et al. | |
| 2007/0012028 A1 | 1/2007 | Weissman et al. | |
| 2008/0016849 A1 | 1/2008 | McCarthy et al. | |
| 2008/0078168 A1* | 4/2008 | Kawamura et al. | 60/285 |
| 2008/0282670 A1* | 11/2008 | McCarthy et al. | 60/274 |
| 2009/0053122 A1* | 2/2009 | Kanda et al. | 423/239.1 |
| 2009/0071130 A1* | 3/2009 | Fukuda et al. | 60/286 |
| 2009/0120069 A1 | 5/2009 | Nagaoka et al. | |
| 2009/0158719 A1 | 6/2009 | Hallstrom et al. | |
| 2009/0183493 A1* | 7/2009 | Yoshida et al. | 60/286 |
| 2009/0247392 A1 | 10/2009 | Ghorishi et al. | |
| 2009/0266063 A1* | 10/2009 | Gandhi et al. | 60/301 |
| 2010/0005786 A1* | 1/2010 | Hinz et al. | 60/286 |
| 2010/0011762 A1* | 1/2010 | Hokuto et al. | 60/602 |
| 2010/0212296 A1* | 8/2010 | Iida et al. | 60/285 |
| 2010/0247409 A1* | 9/2010 | Collier et al. | 423/213.2 |
| 2011/0047977 A1* | 3/2011 | Lee | 60/276 |
| 2011/0064632 A1* | 3/2011 | Huang et al. | 423/212 |
| 2011/0120098 A1 | 5/2011 | Inoue | |
| 2011/0209467 A1* | 9/2011 | Perry et al. | 60/303 |
| 2012/0107204 A1* | 5/2012 | Cox | 423/213.5 |
| 2012/0204547 A1* | 8/2012 | Ishimaru et al. | 60/301 |
| 2013/0028795 A1 | 1/2013 | Bisaji et al. | |
| 2013/0152552 A1 | 6/2013 | Sakurai et al. | |
| 2013/0213008 A1* | 8/2013 | Kumar et al. | 60/274 |
| 2014/0130481 A1* | 5/2014 | Eager et al. | 60/274 |
| 2014/0237995 A1 | 8/2014 | Yezerets et al. | |

\* cited by examiner

SYSTEM, METHOD, AND APPARATUS FOR SULFUR RECOVERY ON AN SCR CATALYST

CROSS-REFERENCE TO RELATED APPLICATION

The present application claims the benefit of Provisional Application No. 61/768,773 filed on Feb. 25, 2013, which is incorporated herein by reference in its entirety for all purposes.

BACKGROUND

The present application generally relates to exhaust aftertreatment systems, and in particular to exhaust aftertreatment systems including a selective catalytic reduction (SCR) for reducing $NO_x$ emissions. Modern internal combustion engine systems often utilize aftertreatment devices to treat the engine exhaust and reduce exhaust emissions. Commonly used devices include catalytic elements, such as oxidation catalysts, catalyzed particulate filters, and selective catalytic reduction (SCR) catalyst systems. Many catalytic elements have catalyst materials which are neutralized, deactivated, or experience reduced effectiveness when exposed to sulfur compounds over time. The deactivation by sulfur over time is an accumulative process, limiting the effective life of the catalytic component, or requiring periodic removal of the sulfur compounds.

The presence of sulfur decreases the efficiency of various components in the exhaust aftertreatment system. Presently known sulfur removal processes require exposing the SCR catalyst to very high temperatures, which may significantly impact fuel economy, mission performance of the engine, and expose the other exhaust aftertreatment system components to increased aging. Therefore, a need remains for further improvements in systems, apparatus, and methods for SCR aftertreatment systems.

SUMMARY

One embodiment is a unique system, method and apparatus to treat an SCR catalyst having an amount of sulfur by providing a fluid stream having a reductant amount and a temperature, the temperature being between 300-700° C. inclusive and the reductant amount comprising an amount of urea, ammonia, or hydrocarbons. In another embodiment the temperature is between 550-700° C. inclusive. Another embodiment is a unique system, method and apparatus to treat an SCR catalyst having an amount of sulfur by providing a fluid stream having an amount of unburned hydrocarbons and a temperature, the temperature being at least 250° C. in one embodiment, and at least 400° C. in yet another embodiment. Still another embodiment is a unique system including an engine, a reduction catalyst, and a controller structured to determine a sulfur amount on the reduction catalyst and provide command(s) to the system to treat the reduction catalyst.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
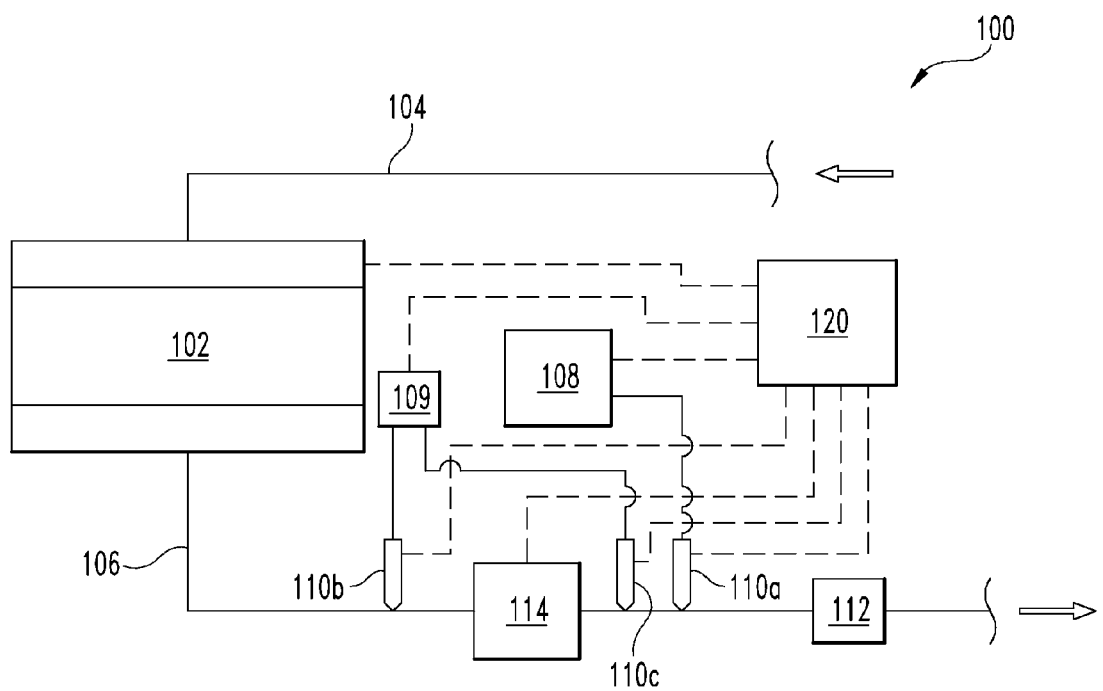
FIG. 1 is a schematic illustration of a system including an exemplary engine and exhaust aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated an exemplary system 100 including an internal combustion engine 102 producing an exhaust gas having a $NO_x$ constituent. The engine 102 may be any kind known in the art, including a diesel, gasoline, natural gas, or any other engine producing exhaust gases having $NO_x$. Engine 102 includes an intake system 104 through which charge air enters and an exhaust system 106 through which exhaust gas resulting from combustion exits, it being understood that not all details of these systems that are typically present are shown.

The system 100 further includes a selective catalytic reduction (SCR) aftertreatment system 112 operationally coupled to the exhaust system 106. In the example system 100, the exhaust gas passes through the SCR aftertreatment system 112. SCR aftertreatment system 112 promotes a chemical reaction between the reductant and $NO_x$ in the exhaust gas that reduces an amount of the $NO_x$ during nominal operation, at least partially converting $NO_x$ to $N_2$ to reduce the emissions of the engine 102.

In certain embodiments, the SCR aftertreatment system 112 may be a subsystem of an exhaust aftertreatment system that may include one or more other aftertreatment components not shown, such as an ammonia oxidation (AMOX) catalyst, a diesel particulate filter (DPF), and various temperature, pressure and exhaust gas constituent sensors. It is contemplated that exhaust system 106 may also include various components not shown, such an exhaust gas recirculation system, a turbocharger system, coolers, and other components connecting exhaust system 106 to intake system 104.

The exhaust gases generally contain an amount of sulfur. The sulfur may be present as a constituent of the fuel or various lubricants in the engine 102. Portions of sulfur may be adsorbed onto a reduction catalyst, such as an SCR catalyst, which forms a portion of the SCR aftertreatment system 112. The adsorbed sulfur may stay on the SCR catalyst semi-permanently and displace catalyst sites for $NO_x$ conversion, resulting in a "poisoning" or reduction of the effectiveness of the SCR catalyst to catalyze desired reactions for treating the exhaust gases, such as reducing $NO_x$. The catalyst may be of any type subject to sulfur poisoning, including at least zeolite, vanadium, base metals, and/or any other type of catalyst known in the art.

The adsorbed sulfur is a relatively permanent condition, and in the presently known art very high temperatures are required to drive the sulfur off in significant amounts and regenerate the catalyst. The high temperatures required to regenerate the catalyst can damage or reduce the operating life of the SCR catalyst or other catalysts or components of the exhaust aftertreatment system. The high temperatures are also relatively expensive (fuel economy, part wear increase, service life decrease, etc.) and inconvenient or impossible to achieve, depending upon the duty cycle and operating conditions of the engine 102 and system 100.

A reductant injector 110a is mounted on a portion of exhaust system 106 upstream of the SCR aftertreatment system 112 with its outlet, or nozzle, arranged to spray reductant into the exhaust system 106 where it mixes with engine exhaust gas produced by engine 102. The reductant injector 110a is fluidly coupled to a first reductant source 108, such as a storage tank for storing a liquid reductant or a housing for storing a dry reductant in a solid storage media that is released in gaseous form when heated. The first reductant is any type of reductant utilized in the SCR aftertreatment system 112 that results in ammonia being utilized as the final reductant— including at least gaseous or aqueous ammonia. The ammonia, where present, may be provided by injection of urea, which converts to ammonia after evaporation and hydrolysis in the exhaust gas, and/or by injection of ammonia directly. A second injector 110b may be provided upstream of oxidation catalyst 114 and connected to a hydrocarbon reductant source 109. Additionally or alternatively, a third injector 110c is provided upstream of SCR catalyst 112 and, if provided, downstream of oxidation catalyst 114 so that un-oxidized hydrocarbons are provided to SCR catalyst 112. The second reductant source can include a second reductant that is, for example, hydrocarbons in a gaseous form, liquid hydrocarbons, or fluid containing hydrocarbons.

In certain embodiments, the system 100 further includes a controller 120 having a number of modules structured to functionally execute the operations of the controller. It shall be appreciated that the controller 120 or control module may be provided in a variety of forms and configurations including one or more computing devices forming a whole or part of a processing subsystem having non-transitory memory storing computer executable instructions, processing, and communication hardware. The controller 120 may be a single device or a distributed device, and the functions of the controller may be performed by hardware or software. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or on a non-transient computer readable storage medium, and modules may be distributed across various hardware or software components.

Figure 2:
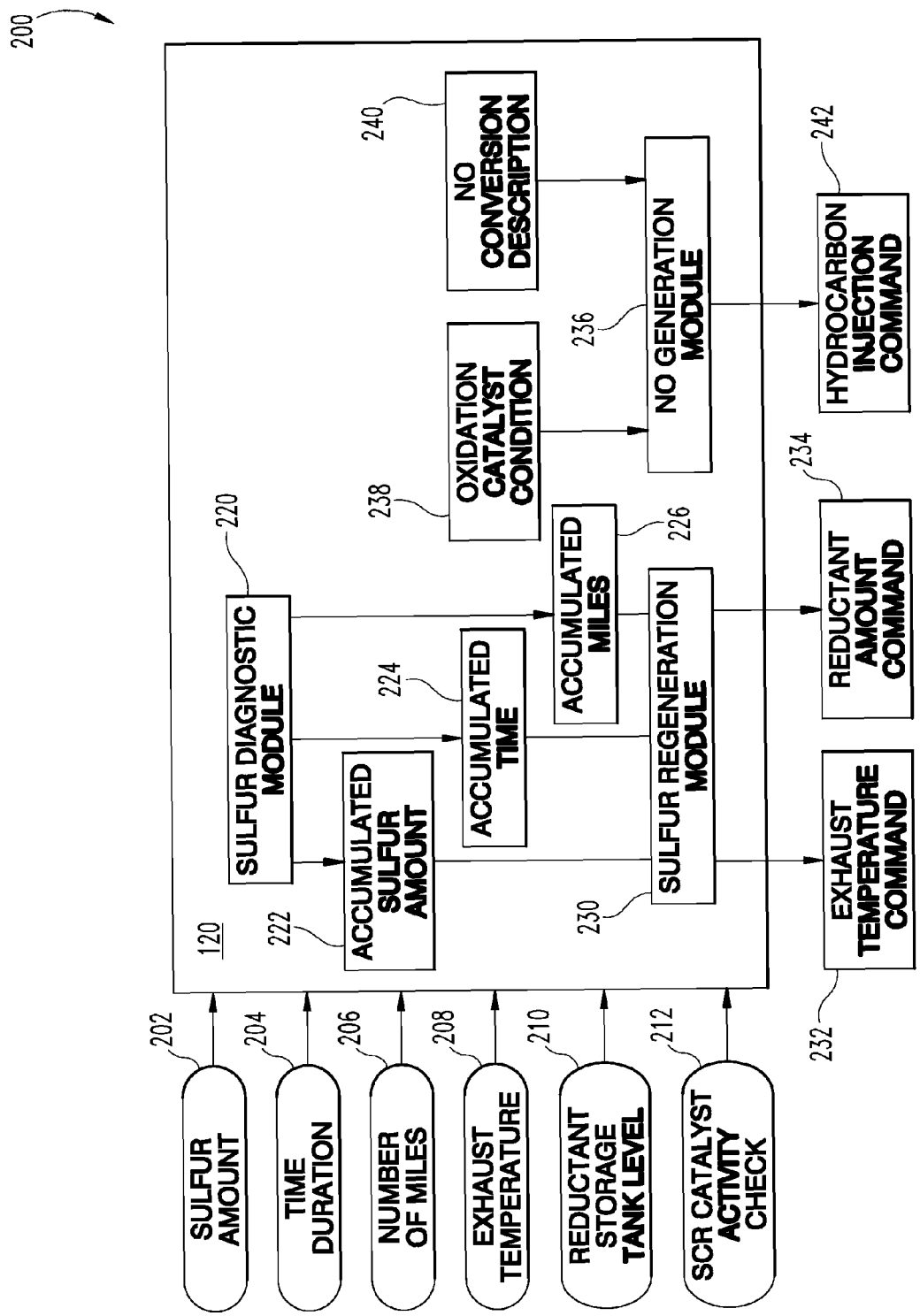
FIG. 2 is a diagram illustrating an exemplary controller apparatus for controlling sulfur regeneration of a selective catalytic reduction (SCR) catalyst.

More specific descriptions of certain embodiments of controller operations are included in the section referencing the apparatus 200 of FIG. 2. Operations illustrated are understood to be exemplary only, and operations may be combined or divided, and added or removed, as well as re-ordered in whole or part, unless stated explicitly to the contrary herein. Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

One exemplary embodiment of the controller 120 structured to functionally execute operations to detect and/or remove an amount of sulfur from the SCR catalyst is shown in FIG. 2. In the illustrated embodiment, the controller 120 includes as inputs a sulfur amount input 202, a time duration input 204, a number of miles input 206, an exhaust temperature input 208, a reductant storage tank level input 210, and an SCR catalyst activity check 212. It is contemplated that the inputs may be measured, such as from sensors located in system 100, calculated, and/or modeled.

In certain embodiments, the sulfur amount input 202 may include an amount of sulfur passing through the SCR catalyst (e.g. due to fuel and/or lubricating oil consumption). The time duration input 204 may include an engine operating time, an operating time above a certain load threshold, and an amount of time that has passed since a previous desulfation event, for example. The number of miles input 206 may include the number of miles passed, or travelled, in embodiments where system 100 is included in a vehicle, for example, since a previous desulfation event. The SCR catalyst activity check input 212 may be an active or passive check of catalyst activity, including conversion rates of $NO_x$ to $N_2$ during a period of time where $NH_3$ storage on the catalyst is negligible (e.g. during a high temperature operation), a loss of activity (e.g. utilizing $NO_x$ and/or $NH_3$ sensors to diagnose $NH_3$ storage or $NO_x$ conversion activity), and/or a check of $NH_3$ storage capacity.

The controller 120 further includes a sulfur diagnostic module 220 and a sulfur regeneration module 230. The sulfur diagnostic module 220 interprets a sulfur amount on the SCR catalyst. The operation to interpret the sulfur amount includes any operation that provides an estimate of the amount of sulfur present on the SCR catalyst. Example and non-limiting operations include monitoring catalyst activity for accumulating a total for at least one of the sulfur amount input 202, the time duration input 204, the number of miles input 206. Any one or more operations to interpret the sulfur amount may be calibrated against direct catalyst sulfur measurement, field experience, emissions testing, or by any other method.

The sulfur regeneration module 230 provides an exhaust temperature command 232 for elevating the temperature of the exhaust gas and a reductant amount command 234 for providing a reductant amount to the exhaust conduit, each in response to the sulfur amount on the SCR catalyst exceeding a sulfur amount threshold. The exhaust temperature command 232 and reductant amount command 234 are provided to give sufficient temperature and reductant activity, respectively, to regenerate the SCR catalyst from sulfur poisoning. The exhaust temperature command 232 may be any amount, and may depend upon the reductant storage tank level input 210 (e.g. as deliverable by the reductant source 108) and by the amount of time available to perform the regeneration. Similarly, the reductant amount command 234 may be any amount, and may depend upon the exhaust temperature input 208 achievable in the system and by the amount of time available to perform the regeneration.

Example and non-limiting means for elevating the temperature of the exhaust gas, which is responsive to the exhaust temperature command 232, are described herein. An example means includes injecting hydrocarbons into the exhaust gas (e.g. diesel fuel, natural gas, etc.) and oxidizing the hydrocarbons in the exhaust gas. Another example means includes hydrocarbons provided into the exhaust gases from an engine fuel system, for example through a very late post injection fueling event where the hydrocarbons do not fully combust in the exhaust gases. Additionally or alternatively, adjustments in the air handling system of the engine, such as partial closure of an intake throttle or an exhaust throttle, manipulation of a turbocharger such as operating a turbocharger in a closed mode or overclosed mode are contemplated herein.

Another example means for elevating the temperature of the exhaust gas includes bypassing or partially bypassing a cooler, such as an EGR cooler bypass or a charge air cooler bypass. Another example means includes engaging a direct heater such as a burner or electric heater device. Still another example means includes providing external air that is heated to the SCR catalyst, such as by directing air into the exhaust system of an engine on a vehicle, and/or by removing the SCR catalyst from the exhaust aftertreatment system and providing it to an external regeneration device at a service event. An external oven or other heater, in certain embodiments, elevates the temperature of the exhaust gases by heating the oven and thereby heating gases within the SCR catalyst.

Example and non-limiting means for providing a reductant to the exhaust conduit at a position upstream of the SCR catalyst which is responsive to the reductant amount command 234 are provided herein. The reductant includes any type of reductant described herein, including at least ammonia, ammonia and NO present in an equimolar ratio, ammonia and NO present in an effective ratio, hydrocarbons, urea, an amine, and at least one compound having nitrogen present in a negative oxidation state. The means for providing the reductant includes at least a reductant injector, such as the reductant injector 110a in system 100. The reductant provided to a position upstream includes reductant provided at any position that will subsequently contact the SCR catalyst, including injection upstream in an exhaust conduit and/or reductant added to an external device containing the SCR catalyst.

An example sulfur regeneration module further provides the exhaust temperature command 232 and the reductant amount command 234 for a period of time between five minutes and three hours. The amount of time for the regeneration is dependent upon several factors including, without limitation, the catalyst formulation, the reductant utilized, the ability to control the amount of $NO_2$ present, the desired and achieved temperature of the regeneration operation, the ability of the system (either run-time on a vehicle, or at a service center) to generate the desired temperature for the desired time, and/or the desired degree of sulfur regeneration to be achieved. In certain embodiments, times lower than thirty minutes may be acceptable to regenerate the catalyst, and in certain embodiments times greater than three hours may be utilized as the time of regeneration.

In a further embodiment, controller 150 includes an NO generation module 236 that interprets an oxidation catalyst condition 238 and an NO conversion description 240, and provides a hydrocarbon injection command 242 in response to the oxidation catalyst condition 238 and the NO conversion description 240. The oxidation catalyst condition 238 is an oxidation catalyst temperature and/or an oxidation catalyst space velocity, although exhaust flow rates, exhaust temperatures, or other parameters can be utilized to model NO conversion of hydrocarbons in an oxidation catalyst. The NO conversion description 240 provides predetermined conditions that provide the proper ratio of NO to other constituents in the exhaust gases such as NH3, and/or a model of NO generation such that the ammonia/urea injection can respond to the varying conditions in the exhaust gases. Injector 110b upstream of oxidation catalyst 114, and/or an injector 110c between oxidation catalyst 114 and SCR catalyst 112, is responsive to the hydrocarbon injection command 242 to provide a hydrocarbon amount to the exhaust gases. Injector 110b, 110c can include, for example, an engine fuel system, a hydrocarbon reformer, and/or a hydrocarbon source, such as the hydrocarbon source 109 in system 100, that provides hydrocarbons to an external heating/regenerating device. The hydrocarbons provided to a position upstream includes hydrocarbons provided at any position that will subsequently contact the oxidation catalyst and/or the SCR catalyst, including injection upstream in an exhaust conduit, injection in an engine cylinder, and/or hydrocarbons added to an external device containing the oxidation catalyst and/or the SCR catalyst.

Figure 3:
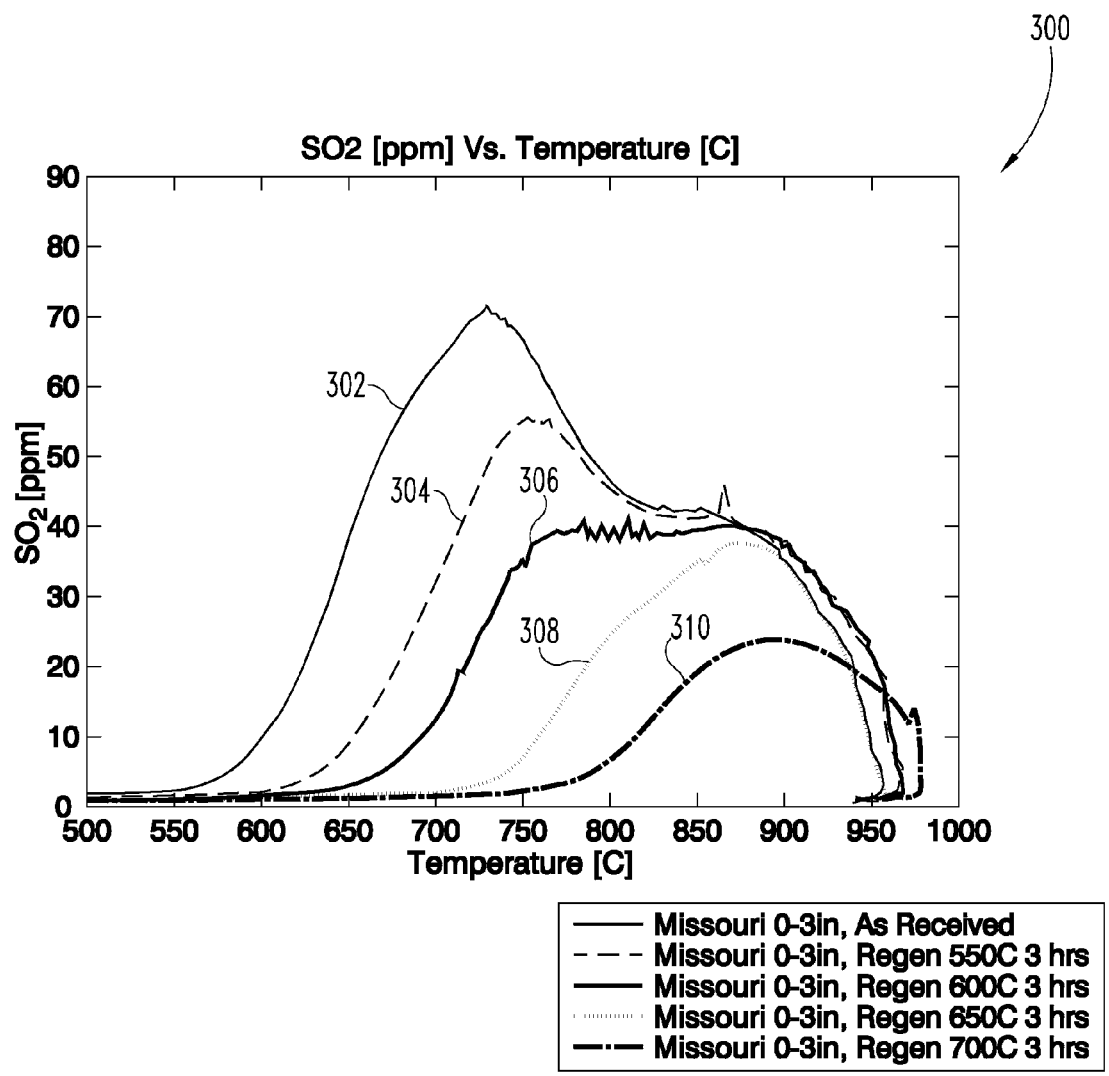
FIG. 3 is a graphical illustration of sulfur removal by temperature treatments between 550° C. and 700° C. for three hours according to the prior art.

Referencing FIG. 3 (prior art) a graph 300 shows sulfur, present as $SO_2$, elution by temperature for an initially sulfur poisoned catalyst 302. Results of the standard regeneration operation known in the art utilizing only a standard exhaust gas mixture and temperature to regenerate the four sulfur poisoned catalysts are depicted by a first curve 304, a second curve 306, a third curve 308, and a fourth curve 310, each curve depicting the amount of sulfur present on each of the corresponding four sulfur poisoned SCR catalysts after treatment. The sulfur poisoned SCR catalyst depicted by curve 302 was exposed to a temperature ramp until a temperature of 1000° C. was reached to provide a base line without regeneration. Each of the sulfur poisoned SCR catalysts depicted by curves 304, 306, 308, and 310 were treated with an exhaust gas mixture at temperatures of 550° C., 600° C., 650° C., and 700° C., respectively, over a period of three hours, followed by the temperature ramp until a temperature of 1000° C. was reached.

It can be seen in FIG. 3 that some sulfur regeneration is possible utilizing only temperature. Significant sulfur regeneration has occurred after three hours of total exposure time to temperatures up to 700° C. However, sulfur regeneration at 700° C. incurs a number of drawbacks. Among the drawbacks, 700° C. is near the failure temperature of the catalyst, and significant loss of catalyst and substrate life can occur, especially where the temperature may not be closely controlled. Further, maintenance at 700° C. for extended periods is expensive from a fuel economy standpoint, and it is extremely unlikely or impossible that a given application can achieve or maintain 700° C. exhaust temperatures for extended periods.

Accordingly, where temperature alone is utilized as a regeneration mechanism, regeneration events are either a service event, or they are an extended ongoing process where some time at temperature is achieved for brief periods, and then the regeneration event must be canceled when temperatures cannot be maintained and continued at a later time. Even where the temperature alone regeneration is scheduled as a service event, special facilities must be provided to achieve a temperature of 700° C. for extended periods. Where a lower temperature is utilized, the time required at the temperature to achieve acceptable regeneration increases non-linearly, increasing the cost of the service event, increasing the downtime of the associated application (e.g. a vehicle), and/or introducing the expense or complexity of maintaining a number of additional catalyst elements to change out and regenerate catalysts entirely out of the line of service.

Figure 4:
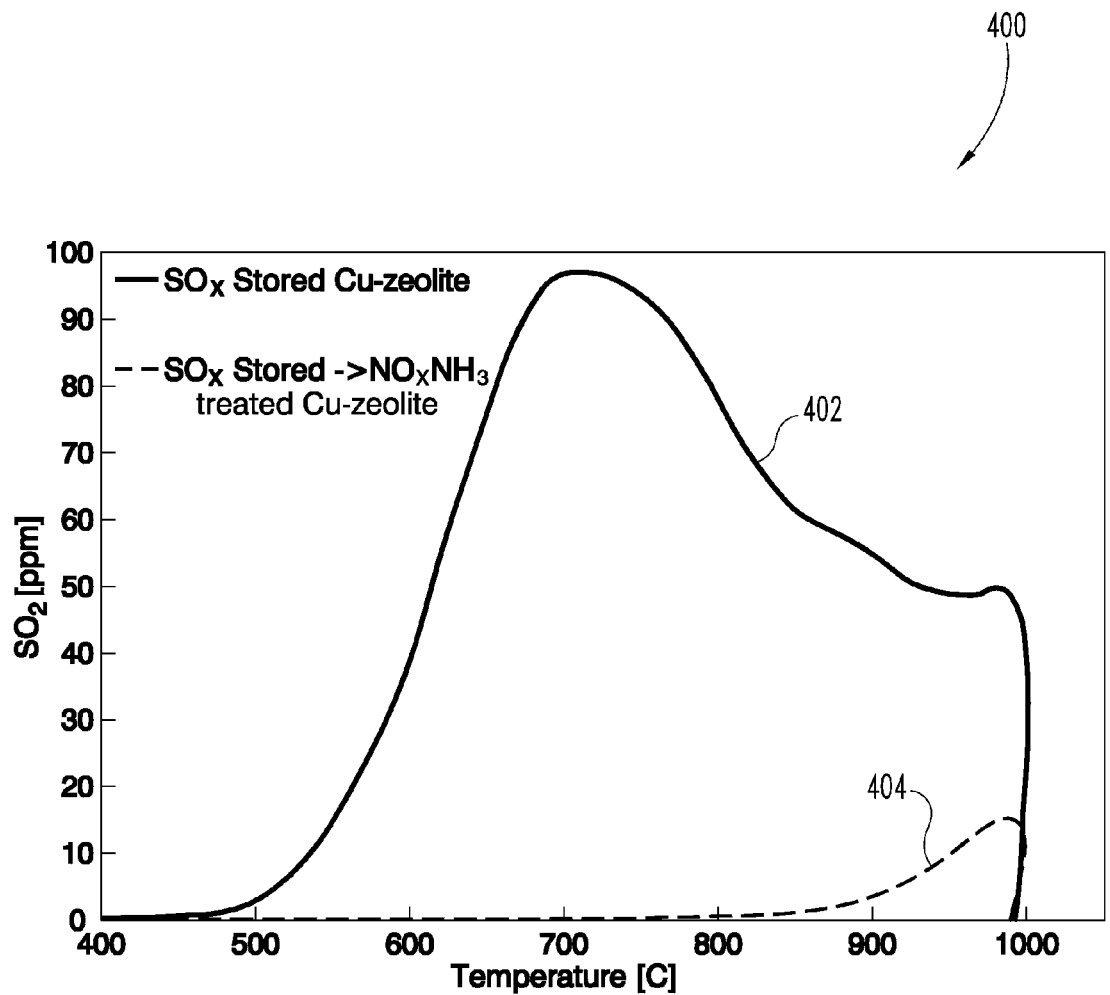
FIG. 4 is a graphical illustration of sulfur stored and released from a sulfur poisoned and regenerated SCR catalyst according to the present disclosure.

Referencing FIG. 4, graph 400 illustrates the amount of sulfur stored and released (illustrated by temperature elution of sulfur) from a sulfur poisoned and regenerated copper zeolite catalyst during a temperature ramp to 1000° C. Graph 400 further illustrates a regeneration non-treatment curve 402 and a regeneration treatment curve 404. The regeneration non-treatment curve 402 depicts a sulfur poisoned copper zeolite catalyst that was not treated, while regeneration treatment curve 404 shows a sulfur poisoned copper zeolite catalyst that was exposed to a sequence of an equimolar mixture of NO and $NH_3$, not in the presence of $NO_2$, and at temperatures that did not exceed 550° C. The regeneration amount depicted in FIG. 4 is believed to be consistent with over 90% removal of sulfur from the catalyst, and is more complete than the temperature based removal even at 700° C.

Figure 5:
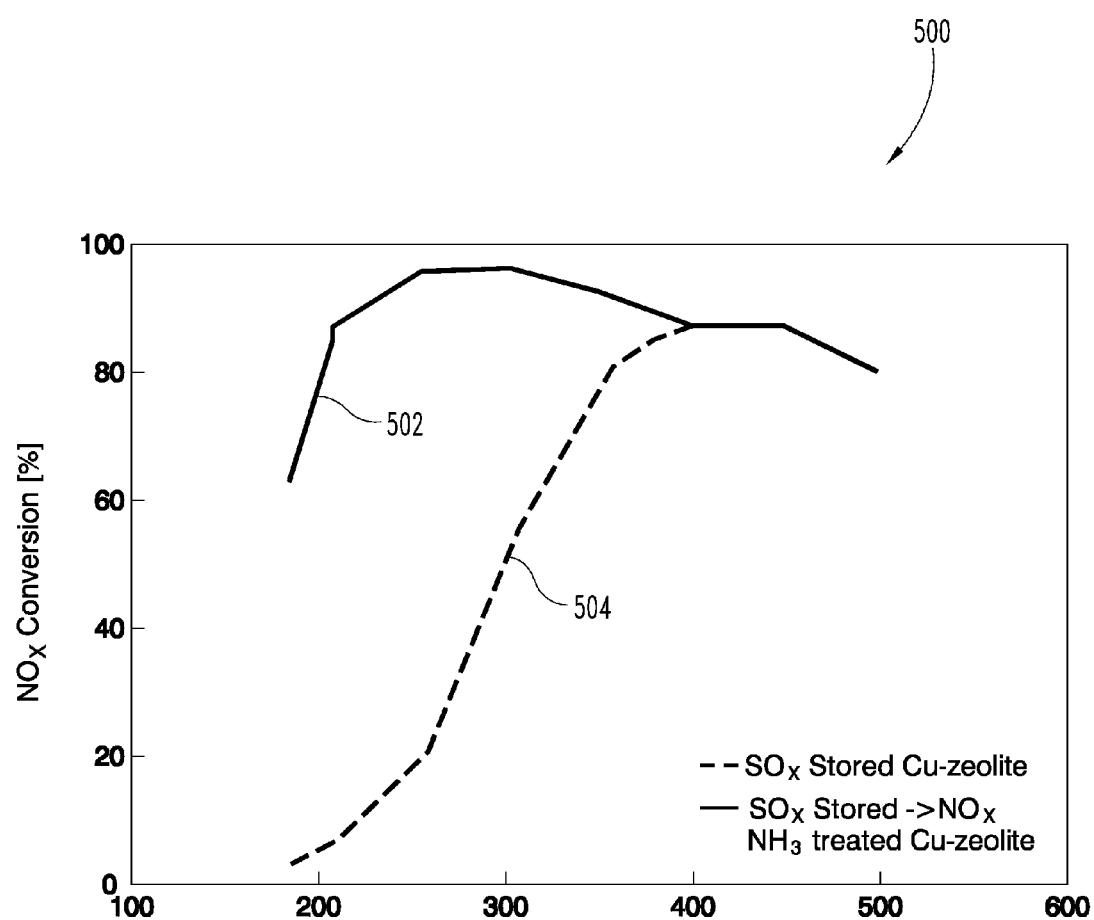
FIG. 5 is a graphical illustration of the recovery of $NO_x$ conversion after a sulfur regeneration.

In FIG. 5, graph 500 shows a lab measured $NO_x$ conversion efficiency that occurred after the regeneration of a sulfur poisoned copper zeolite catalyst. Generally, sulfur exposure degrades the $NO_x$ conversion efficiency of the sulfur stored copper zeolite catalyst, especially at temperatures below 350° C., as depicted in a non-treatment curve 504. A similarly sulfur stored copper zeolite catalyst, depicted in a treatment curve 502, was exposed to a sequence of an equimolar mixture of NO and $NH_3$, not in the presence of $NO_2$, and at temperatures that did not exceed 550° C. The catalyst recovery depicted in FIG. 5 is believed to have recovered performance below 400° C.

Without being limited to a particular theory of operation, it is believed that a reductant present on the catalyst during the regeneration treatment enhances the regeneration by promoting a decreased oxidation state of the catalyst metal (e.g. copper in the copper zeolite). Additionally, the reductant enhances the formation of $SO_2$ from $SO_3$ present in the catalyst, which is then more easily removed. Regardless of the mechanism of operation, the presence of NO with $NH_3$ provides for superior removal, and the removal of $NO_2$ from the exhaust gases likewise enhances the removal.

Additionally or alternatively, unburned hydrocarbons, injected downstream of the oxidation catalyst and/or upstream of the oxidation catalyst, which may be partially burned or oxidized, may also enhance the regeneration and allow for sulfur regenerations to occur down to temperatures as low as 250° C. Sulfur regeneration temperatures as low as 250° C. allow for greater flexibility of the regeneration event, including regeneration events that can be performed on a vehicle remaining in-use. Additionally, the greater flexibility to increase the temperature above the minimum regeneration temperature (e.g. 500° C. being 250° C. greater than the minimum temperature where the minimum is 250° C.) allows for greater control of the time of the regeneration event, as well as improved catalyst service life and greater tolerance to variability in the temperature control. The description herein including 250° C. as a minimum temperature for the regeneration is dependent upon several factors including, without limitation, the catalyst formulation, the reductant utilized, the ability to control the amount of $NO_2$ present, the desired time for the regeneration to complete, the ability of the system (either run-time on a vehicle during an in-use sulfur treatment while the vehicle/engine is being operated for its intended purpose, or at a service center for a service sulfur treatment while the vehicle/engine is serviced) to generate the desired temperature for the desired time, and/or the desired degree of sulfur regeneration to be achieved.

In certain embodiments, temperatures lower than 400° C. may be acceptable to regenerate the catalyst, and in certain embodiments temperatures exceeding 500° C., 550° C., 600° C., or higher may be utilized as the minimum temperature. In certain embodiments, the ability to utilize temperatures at least periodically at and in excess of 550° C. can achieve sulfur removal from the SCR catalyst even without injection of the first reductant.

Figure 6:
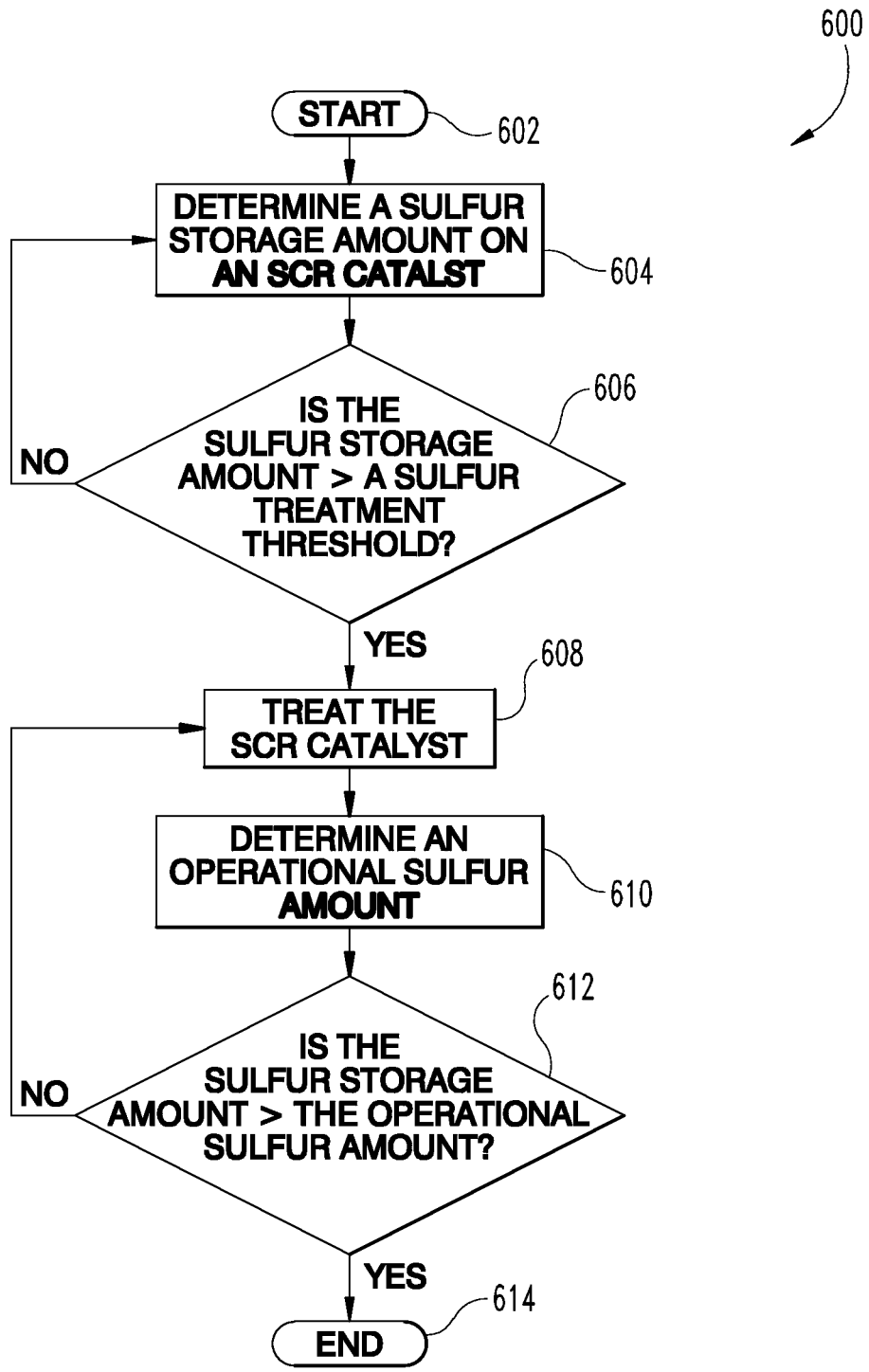
FIG. 6 is a flow diagram illustrating an exemplary procedure for treating an SCR catalyst exposed to sulfur.

FIG. 6 illustrates a flow diagram of an exemplary procedure 600 for treating an SCR catalyst exposed to sulfur. Procedure 600 begins at operation 602, in which a process for treating the SCR catalyst from sulfur exposure is performed. Operation 602 may begin by interpreting a key-on event, completion of a cycle, restarting procedure 600 upon completion, or by initiation by the operator or a technician.

The schematic flow descriptions which follow provide illustrative embodiments of performing procedures for treating an SCR catalyst from sulfur exposure. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Procedure 600 continues at operation 604 to determine a sulfur storage amount on an SCR catalyst. From operation 604, procedure 600 continues at conditional 606 to determine whether the SCR catalyst sulfur storage amount is greater than a sulfur treatment threshold. If the SCR catalyst sulfur storage amount is less than or equal to the sulfur treatment threshold, procedure 600 returns to operation 604 to again determine the SCR catalyst sulfur storage amount. If the SCR catalyst sulfur storage amount is greater than the sulfur treatment threshold, then procedure 600 continues at operation 608 to treat the SCR catalyst.

Procedure 600 continues at operation 610 to determine an operational sulfur amount. From operation 610, procedure 600 continues at conditional 612 to determine whether the sulfur storage amount is less than the operational sulfur amount. If the sulfur storage amount is less than the operational sulfur amount determined in operation 610, procedure 600 continues at operation 614, where procedure 600 ends. If the sulfur storage amount is greater than or equal to the operational sulfur amount determined in operation 610, procedure 600 returns to operation 608 to continue treating the SCR catalyst.

As is evident from the figures and text presented above, a variety of embodiments are contemplated and various aspects of the system and methods are disclosed herein.

For example, one aspect involves a method including treating a reduction catalyst having an amount of sulfur thereon. The treating includes providing a fluid stream at a position upstream of the reduction catalyst, and the fluid stream includes a reductant amount and a temperature. An example temperature is between 300-700° C. inclusive, and the reductant amount includes an amount of urea, ammonia, or hydrocarbons. In certain embodiments, the temperature may be between 300-550° C. inclusive. In other embodiments, the temperature may be between 550-700° C. inclusive.

In one embodiment, the method further includes providing a hydrocarbon amount at a position upstream of an oxidation catalyst, with the oxidation catalyst positioned upstream of the reduction catalyst; increasing an NO amount of an NO to $NO_2$ distribution of $NO_x$ in the fluid stream, where the NO to $NO_2$ distribution of $NO_x$ in the fluid stream includes greater than 60% NO and/or greater than 80% NO; and/or oxidizing NH$_3$ on the reduction catalyst and forming NO thereupon (e.g. through the reaction 2NH$_3$+2.5O$_2$→2NO+3H$_2$O).

In another embodiment, the method includes performing the treating for a time period between five minutes and three hours, removing at least 90% of adsorbed sulfur on the catalyst with the treating, and/or removing at least 50% of the adsorbed sulfur on the catalyst with the treating. In still another embodiment, the method includes the reductant amount being an excess reductant amount, the reductant amount being an excess reductant amount that includes an amount of reductant that provides a molar ratio of reductant to NO$_x$ in the fluid stream that is greater than a stoichiometric ratio of reductant to NO$_x$, an amount of reductant in the fluid stream that is greater than twice the stoichiometric ratio of reductant to NO$_x$, and/or an amount of reductant that is greater than five times the stoichiometric ratio of reductant to NO$_x$.

In yet another embodiment, the method includes reducing an NO to NO$_2$ conversion amount on an oxidation catalyst positioned in the fluid stream at a position upstream of the reductant catalyst during the treating, determining a sulfur storage amount on the reductant catalyst, where the treating is performed in response to the sulfur storage amount exceeding a sulfur treatment threshold, stopping the treating in response to the sulfur storage amount falling below an operational sulfur amount, and/or distinguishing between an in-use sulfur treatment during operations of the vehicle and a service sulfur treatment such as during a service event where the catalyst is removed from the exhaust system and/or the vehicle/engine is not operated for its intended purpose, where the distinguishing comprises adjusting the operational sulfur amount. For example, a service sulfur treatment may provide an operational sulfur amount that is lower than an operational sulfur amount provided during an in-use sulfur treatment. Another embodiment of the method includes providing a hydrocarbon amount at a position upstream of the reduction catalyst. The position can be downstream of an oxidation catalyst so the hydrocarbon amount is not oxidized before reaching the reduction catalyst.

In another aspect, a method includes treating a reduction catalyst having an amount of sulfur thereon, where the treating includes providing a fluid stream having an amount of unburned hydrocarbons and a temperature, and where the temperature is at least 250° C. Another embodiment includes a temperate of at least 400° C. One embodiment of the method includes the unburned hydrocarbons having an effective amount of unburned hydrocarbons that reduce an oxidation state of copper in the reduction catalyst. In certain embodiments, the temperature is a value between 300° C. and 700° C., inclusive; a value below 600° C., a value below 550° C., and/or a value below 500° C.

Another embodiment of the method includes performing the treating for a time period between five minutes and three hours. In certain embodiments, the method includes removing at least 90% of adsorbed sulfur on the catalyst during the treating or removing at least 50% of the adsorbed sulfur on the catalyst. In another embodiment, the method further includes determining a sulfur storage amount on the reductant catalyst, and performing the treating in response to the sulfur storage amount exceeding a sulfur treatment threshold. In still another embodiment, the method includes stopping the treating in response to the sulfur storage amount falling below an operational sulfur amount. In certain embodiments, the method includes distinguishing between an in-use sulfur treatment and a service sulfur treatment, and adjusting the operational sulfur amount in response to the in-use or service sulfur treatment. In another embodiment, the amount of unburned hydrocarbons are not oxidized over an oxidation catalyst before reaching the reduction catalyst. In a further embodiment, the fluid stream is provided downstream of an oxidation catalyst.

Another aspect includes a system including an engine which produces an exhaust gas having NO$_x$ as a byproduct of operation. The system further includes a reduction catalyst operationally coupled to an exhaust conduit of the engine, and a controller having a number of modules structured to functionally execute operations to detect and/or remove an amount of sulfur from the reduction catalyst. The controller includes a sulfur diagnostic module that interprets a sulfur amount on the reduction catalyst, and a sulfur regeneration module that provides an exhaust temperature command and a reductant amount command in response to the sulfur amount on the reduction catalyst exceeding a sulfur amount threshold. The system further includes means for elevating a temperature of the exhaust gas which is responsive to the exhaust temperature command, and means for providing a reductant to the exhaust conduit at a position upstream of the reductant catalyst which is responsive to the reductant amount command.

In one embodiment, the system further includes at least one of ammonia, ammonia and NO present in an equimolar ratio, ammonia and NO present in an effective ratio, hydrocarbons, urea, an amine, and at least one compound having nitrogen present in a negative oxidation state being provided to the SCR catalyst during sulfur removal. In another embodiment, the sulfur regeneration module further provides the exhaust temperature command and a reductant amount command for a period of time between five minutes and three hours.

In still another embodiment, the reductant is a hydrocarbon, and the system further includes means for providing the reductant at a position upstream of an oxidation catalyst, where the oxidation catalyst is operationally coupled to the exhaust conduit at a position upstream of the reductant catalyst. Hydrocarbon contact with an oxidation catalyst at the proper temperature can be oxidized into NO, providing the NO to achieve an NO—NH$_3$ mixture, and/or enhancing the amount of NO in the exhaust gases. In another embodiment, the system includes means for providing a hydrocarbon to the exhaust conduit at a position downstream of the oxidation catalyst to provide un-oxidized hydrocarbons to the reduction catalyst. In one refinement of the embodiment, the embodiment further includes the controller having an NO generation module that interprets an oxidation catalyst condition and an NO conversion description, and provides a hydrocarbon injection command in response to the oxidation catalyst condition and the NO conversion description. The NO conversion description provides predetermined conditions that provide the proper ratio of NO to NH$_3$ in the exhaust gases, and/or a model of NO generation such that the hydrocarbon injection can respond to the varying conditions in the exhaust gases. In the refinement, the means for providing the hydrocarbon is responsive to the hydrocarbon injection command. An example means for providing hydrocarbons includes an hydrocarbon injector operationally coupled to the exhaust conduit at a position upstream of the oxidation catalyst. In a further refinement, the embodiment includes the oxidation catalyst condition being an oxidation catalyst temperature and/or an oxidation catalyst space velocity, although exhaust flow rates, exhaust temperatures, or other parameters can be utilized to model NO conversion in an oxidation catalyst.

In yet another refinement, the embodiment includes means for reducing an NO to NO$_2$ conversion amount in the exhaust conduit at a position upstream of the reduction catalyst. Example and non-limiting means for reducing an NO to NO$_2$ conversion amount in the exhaust conduit at a position upstream of the reduction catalyst are described herein. An example means includes at least partially bypassing an oxidation catalyst upstream of the reduction catalyst. Another example means includes increasing an exhaust flow rate of exhaust gas through the oxidation catalyst. Another example means includes providing a hydrocarbon amount to the oxidation catalyst, thereby suppressing an NO to $NO_2$ reaction on the oxidation catalyst. Another example means includes increasing a temperature of the oxidation catalyst such that a thermal equilibrium of the NO to $NO_2$ reaction favors a lower $NO_2$ conversion amount.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising determining a sulfur storage amount on a reductant catalyst, treating the reduction catalyst having the sulfur storage amount thereon in response to the sulfur storage amount exceeding a sulfur treatment threshold, wherein the treating comprises providing a fluid stream having a reductant amount and a temperature, wherein the temperature is between 550-700° C. inclusive, and wherein the reductant amount comprises an amount of urea, ammonia, or hydrocarbons and further comprising distinguishing between an in-use sulfur treatment and a service sulfur treatment and stopping the treating in response to the sulfur storage amount falling below an operational sulfur amount, wherein the distinguishing comprises adjusting the operational sulfur amount.

2. The method of claim 1, further comprising increasing an NO amount of an NO to $NO_2$ distribution of $NO_x$ in the fluid stream.

3. The method of claim 2, wherein the NO to $NO_2$ distribution of NO in the fluid stream includes greater than 60% NO.

4. The method of claim 2, wherein the NO to $NO_2$ distribution of NO in the fluid stream includes greater than 80% NO.

5. The method of claim 1, further comprising oxidizing $NH_3$ on the reduction catalyst and forming NO thereupon ($2NH_3+2.5O_2 \rightarrow 2NO+3H_2O$).

6. The method of claim 1, wherein the treating is performed for a time period between 30 minutes and 3 hours.

7. The method of claim 1, wherein the treating removes at least 90% of adsorbed sulfur on the catalyst.

8. The method of claim 1, wherein the treating removes at least 50% of adsorbed sulfur on the catalyst.

9. The method of claim 1, wherein the reductant amount comprises an excess reductant amount.

10. The method of claim 9, wherein the excess reductant amount comprises an amount of reductant that provides a molar ratio of reductant to $NO_x$ in the fluid stream that is greater than a stoichiometric ratio of reductant to $NO_x$.

11. The method of claim 10, wherein the molar ratio is provided at least twice the stoichiometric ratio.

12. The method of claim 10, wherein the molar ratio is provided at least five times the stoichiometric ratio.

13. The method of claim 1, further comprising reducing an NO to $NO_2$ conversion amount on an oxidation catalyst positioned in the fluid stream at a position upstream of the reductant catalyst during the treating.

14. A method, comprising determining a sulfur storage amount on a reductant catalyst, treating the reduction catalyst having the sulfur storage an amount thereon in response to the sulfur storage amount exceeding a sulfur treatment threshold, wherein the treating comprises providing a fluid stream having an amount of unburned hydrocarbons and a temperature, wherein the temperature is at least 400° C. and further comprising distinguishing between an in-use sulfur treatment and a service sulfur treatment and stopping the treating in response to the sulfur storage amount falling below an operational sulfur amount, wherein the distinguishing comprises adjusting the operational sulfur amount.

15. The method of claim 14, and wherein the unburned hydrocarbons comprises an effective amount of unburned hydrocarbons to reduce an oxidation state of a catalyst metal in the reduction catalyst.

16. The method of claim 14, wherein the temperature is between 400° C. and 700° C., inclusive.

17. The method of claim 14, wherein the temperature is below 600° C.

18. The method of claim 14, wherein the temperature is below 550° C.

19. The method of claim 14, wherein the temperature is below 500° C.

20. The method of claim 14, wherein the treating is performed for a time period between 30 minutes and 3 hours.

21. The method of claim 14, wherein the treating removes at least 90% of adsorbed sulfur on the catalyst.

22. The method of claim 14, wherein the treating removes at least 50% of adsorbed sulfur on the catalyst.

23. A system, comprising:
   an engine producing an exhaust gas having NOx as a byproduct of operation;
   a reduction catalyst operationally coupled to an exhaust conduit of the engine;
   an oxidation catalyst is operationally coupled to the exhaust conduit at a position upstream of the reduction catalyst;
   a controller, comprising:
      a sulfur diagnostic module structured to interpret a sulfur amount on the reduction catalyst;
      a sulfur regeneration module structured to provide an exhaust temperature command and a reductant amount command in response to the sulfur amount on the reduction catalyst exceeding a first threshold amount;
      an NO generation module structured to interpret an oxidation catalyst condition and an ammonia to NO conversion description, and to provide a reductant injection command in response to the oxidation catalyst condition and the ammonia to NO conversion description, wherein each of the modules is implemented in at least one of hardware and a computer readable medium;
   a means for elevating a temperature of the exhaust gas which is responsive to the exhaust temperature command; and a means for providing a reductant to the exhaust conduit at a position upstream of the reduction catalyst which is responsive to the reductant amount command and a means for providing the reductant at a position upstream of the oxidation catalyst that is responsive to the reductant injection command.

24. The system of claim 23, wherein the reductant amount comprises a reductant selected from the reductants consisting of: ammonia, ammonia and NO present in an equimolar ratio, ammonia and NO present in an effective ratio, hydrocarbons, urea, an amine, and at least one compound having nitrogen present in a negative oxidation state.

25. The system of claim 23, wherein the sulfur regeneration module is further structured to provide the exhaust temperature command and a reductant amount command for a period of time between 30 minutes and three hours.

26. The system of claim 23, wherein the oxidation catalyst condition comprises at least one parameter selected from the parameters consisting of an oxidation catalyst temperature and an oxidation catalyst space velocity.

27. The system of claim 23, further comprising a means for reducing an NO to $NO_2$ conversion amount in the exhaust conduit at a position upstream of the reduction catalyst.

* * * * *